US009953034B1

(12) United States Patent
Parlikar (10) Patent No.: US 9,953,034 B1
(45) Date of Patent: Apr. 24, 2018

(54) SYSTEM AND METHOD FOR SHARING TRIMMED VERSIONS OF DIGITAL MEDIA ITEMS

(75) Inventor: Tushar Parlikar, Somerville, MA (US)

(73) Assignee: GOOGLE LLC, Mountain View, CA (US)

(*) Notice: Subject to any disclaimer, the term of this patent is extended or adjusted under 35 U.S.C. 154(b) by 575 days.

(21) Appl. No.: 13/449,215

(22) Filed: Apr. 17, 2012

(51) Int. Cl.
*G06F 17/30* (2006.01)

(52) U.S. Cl.
CPC .. *G06F 17/30064* (2013.01); *G06F 17/30017* (2013.01)

(58) Field of Classification Search
CPC .. G06F 17/3089; G06F 17/24; G06F 17/3011; G06F 17/30684; G06F 17/30882; G06F 17/211; G06F 17/30017
USPC ........................................ 715/201, 205, 208
See application file for complete search history.

(56) References Cited

U.S. PATENT DOCUMENTS

| 7,805,678 B1* | 9/2010 | Niles ..................... G06F 3/0483 715/716 |
| 2005/0210145 A1 | 9/2005 | Kim et al. |
| 2008/0162670 A1 | 7/2008 | Chapweske et al. |
| 2008/0313541 A1 | 12/2008 | Shafton et al. |
| 2009/0013252 A1* | 1/2009 | DeWitt ........................ 715/716 |
| 2009/0064005 A1* | 3/2009 | Cunningham et al. ....... 715/764 |
| 2010/0153848 A1 | 6/2010 | Saha |
| 2012/0017153 A1* | 1/2012 | Matsuda ............... G11B 27/034 715/725 |
| 2012/0094768 A1* | 4/2012 | McCaddon et al. ............ 463/42 |
| 2012/0096357 A1* | 4/2012 | Folgner .................. G11B 27/34 715/726 |
| 2012/0315014 A1 | 12/2012 | Shuster |
| 2013/0129308 A1* | 5/2013 | Karn et al. ..................... 386/230 |

OTHER PUBLICATIONS

J. Carlton Collins, Welcome to the Chop Shop (Nov. 2011 of Journal of Accountancy), Nov. 15, 2011, American Institute of Certified Public Accountants, http://www.journalofaccountancy.com/Issues/2011/Nov/TubeChop.htm, p. 1.*
Samuel, 2 Ways to Email iPhone Videos/Photos, Nov. 21, 2011, Wondershare Blog located in http://blog.wondershare.com/2-ways-to-email-iphone-videos-photos/, p. 1.*
Rik Nyslewski, YouTube adds video editor for noobs, Jun. 16, 2010, The Register, pp. 1-2.*

(Continued)

*Primary Examiner* — Scott Baderman
*Assistant Examiner* — Seung Jung
(74) *Attorney, Agent, or Firm* — Lowenstein Sandler LLP (57) ABSTRACT

A computing device that provides access to digital media items receives a command from an entity to share a digital media item that was uploaded by another entity. The computing device invokes an interface for trimming the digital media item in response to receiving the command. The computing device receives input for a trim operation to be performed on the digital media item. The computing device then provides a link or embed code for the digital media item for posting on a web site, wherein accessing the link or embed code causes the output of the trim operation to be presented to a user.

21 Claims, 9 Drawing Sheets

(56) References Cited

OTHER PUBLICATIONS

Rik Myslewski, "YouTube adds video editor for noobs" article found at https://www.theregister.co.uk/2010/06/16/youtube_video_editor/, Jun. 16, 2010, The Register, pp. 1-2.*

CyberLink Power Director 9 User's Guide, Nov. 25, 2010, CyberLink, pp. 57-58.*

Wiebe, Glenn. "TubeChop is easy and cool," History Tech, Jan. 13, 2011, 6 pages, <http://historytech.wordpress.com/2011/01/13/tubechop-is-easy-and-cool/.

YouTube, How to embed a YouTube video, YouTube Help, Mar. 22, 2012, available http://support.google.com/youtube/bin/answer.py?hI=en&answer=171780.

YouTube, Sharing videos, YouTube Help, Jun. 2, 2011, available http://support.google.com/youtube/bin/answer.py?hI=en&answer=57741.

NerdCrunch, http:I/nerdcrunch.com/2011/05/28/how-to-expand-url/, May 28, 2011, 4 pages.

\* cited by examiner

SYSTEM AND METHOD FOR SHARING TRIMMED VERSIONS OF DIGITAL MEDIA ITEMS

TECHNICAL FIELD

Embodiments of the present invention relate to the sharing of digital media items and, more particularly, to an interface for editing digital media items and sharing those digital media items.

BACKGROUND

Many video and image hosting websites allow users to share images or videos with others. For example, users may share videos by posting links to those videos on social networking websites or blogs, by including links in emails, and so on.

SUMMARY

In an embodiment of the present invention, a computing device that provides access to digital media items receives a command from an entity to share a digital media item that was uploaded by an entity, either the same entity or another entity. The digital media item may be, for example, a video or an audio file. The computing device invokes an interface for trimming the digital media item in response to receiving the command. The computing device receives input for a trim operation to be performed on the digital media item. The computing device then provides a link or embed code for the digital media item, wherein accessing the link or embed code causes the output of the trim operation to be presented to a user.

In addition, methods and systems for performing the operations of the above described embodiments are also implemented. Further, a computer readable storage media is provided to store instructions for performing the operations of the above described embodiments.

BRIEF DESCRIPTION OF THE DRAWINGS

The present invention will be understood more fully from the detailed description given below and from the accompanying drawings of various embodiments of the invention.

DETAILED DESCRIPTION

A system and method for sharing trimmed versions of digital media items based on input from an entity are discussed herein. As used herein, a digital media item is an electronic representation of a video or an audio clip. Examples of digital media items include digital music and other audio files (e.g., moving picture experts group (MPEG) audio layer 3 (MP3) files, advanced audio coding (AAC) files, waveform audio file format (WAV) files, audio interchange file format (AIFF) files, Apple Lossless (m4A) files, etc.), and digital videos (e.g., MPEG-2 files, MPEG-4 (MP4) files, DivX files, audio video interlace (AVI) files, advanced video coding (AVC) files, VP8 files, etc.). As used herein, an entity may be a user, a business entity, a web bot (a software application that runs an automated task over the Internet), or any other program, individual or organization.

In one embodiment, a user (or other entity) selects a video (or other digital media item), and issues a command to share the video. In response to receiving the sharing command, a video hosting website (or other digital media host) invokes an interface for trimming the video. Alternatively, a media player running on a client machine may invoke the interface for trimming the video. The user selects a portion of the video for sharing via the interface, and that selected portion is shared without sharing a remainder of the video. The selected portion of the video may be shared by posting a link to the selected portion to social networking websites or blogs, by including the link in email, instant or text messages, and so forth. The selected portion may also be shared by generating embed code and incorporating that embed code in a website. When a user clicks on the link (or embed code), the user will be presented with the selected portion of the video, and not the remainder of the video.

Note that some embodiments of the present invention are described with reference to videos. However, embodiments of the present invention also apply to audio clips (e.g., songs, albums, user generated audio files, etc.). For example, embodiments of the present invention may trim a selected portion of an audio clip, and may share just the trimmed portion.

Figure 1:
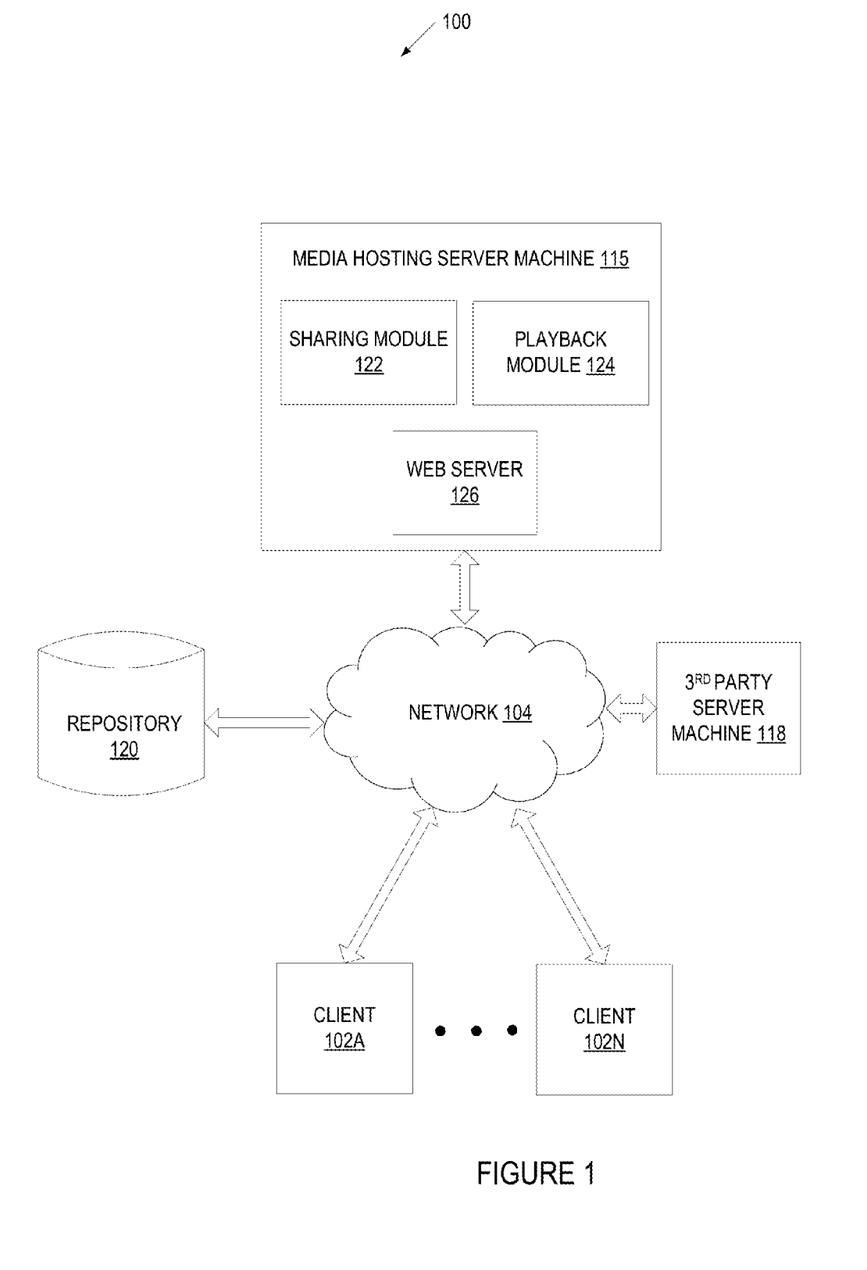
FIG. 1 illustrates an exemplary system architecture, in accordance with one embodiment of the present invention.

FIG. 1 illustrates an example system architecture 100, in accordance with one embodiment of the present invention. The system architecture 100 includes a server machine 115, a repository 120, a third party server machine 118 and client machines 102A-102N connected to a network 104. Network 104 may be a public network (e.g., the Internet), a private network (e.g., a local area network (LAN) or wide area network (WAN)), a cellular network, a broadcast network, or a combination thereof.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue queries and commands to the web server, such as commands to access a specific digital media item, commands to share the digital media item, commands to trim the digital media item, and so forth. The client machines 102A-102N may also upload digital media items to the web server for storage.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 126, a sharing module 122 and a playback module 124. In alternative embodiments, the web server 126, sharing module 122 and/or playback module 124 may run on different machines. For example, the sharing module 122 may run on a client machine 102A-102N instead of or in addition to on server machine 115. Additionally, in some embodiments, the web server 126, sharing module 122 and/or playback module 124 may be combined into a single component.

Repository 120 is a persistent storage that is capable of storing image files, audio files and/or video files. As will be appreciated by those skilled in the art, in some embodiments repository 120 might be a network-attached file server, while in other embodiments repository 120 might be some other type of persistent storage such as an object-oriented database, a relational database, and so forth, that may be hosted by the server machine 115 or one or more different machines coupled to the server machine 115 via the network 104. The video and/or audio stored in the repository 120 may include user generated content that is uploaded by clients 102A-102N. The video and/or audio may additionally or alternatively include content provided by other entities, e.g., service providers such as news organizations, publishers, libraries and so on.

Web server 140 may receive digital media items from clients 102A-102N, and store those digital media items in repository 120. Web server 140 may additionally serve digital media items (e.g., video, audio and/or images) from repository 120 to clients 102A-102N. Accordingly, web server 140 may provide a media hosting service. Web server 140 may receive search queries from clients 102A-102N and perform searches on the digital media items in the repository 120 to determine digital media items that satisfy the search queries. Web server 140 may send to a client 102A-102N those digital media items that match a search query. Clients 102A-102N may also browse contents of the repository 120. For example, clients may select in a web page specific tabs or filters associated with particular categories of content. Web server 140 may then present digital media items associated with those particular categories to the clients 102A-102N. For videos and/or audio, web server 126 may coordinate with playback module 124 to stream the videos/audio to clients 102A-102N, or may download the video or audio to the clients 102A-102N. In streaming, the clients 102A-102N can begin playback of the video or audio files before receiving the entire audio or video. In contrast, with downloading the audio or video typically is not playable until a complete file is received by the client 102A-102N.

Sharing module 122 edits and shares digital media items. Note that sharing module 122 may run on a media hosting server machine 115 (as shown), or may run on a client 102A-102N. For example, sharing module 122 may be code such as JavaScript that web server 128 sends to a browser running on a client 102A-102N. An entity such as a user of a client 102A-102N viewing and/or listening to a digital media item (e.g., a video, image or audio clip) may want to share the digital media item with others. In some embodiments, the user may want to post a link to the digital media item to a social networking website, blog, forum, or other web site, or may want to email the link to a friend. Sharing module 122 may establish a connection to third party server machine 118 that hosts a specified third party website, and post a link to the digital media item (or embed code associated with the digital media item) onto a web page served by third party server machine 118. In other embodiments, a client 102A-102N may copy a link (or embed code) provided by sharing module 122, and paste that link (or embed code) to a website of third party server machine 118. The third party server machine 118 may host a web site such as a blog, an ecommerce website, a social networking website, or other type of website. If the third party server machine 118 hosts a social networking website, for example, sharing module 122 or clients 102A-102N may post a link to the digital media item on a particular profile or homepage of a user on the social networking website.

Frequently, an entity such as a user or organization is interested in sharing a portion of a digital media item (e.g., highlights of or a short segment within a video). Accordingly, sharing module 122 may provide an interface that enables users to edit and share edited versions of digital media items. Sharing module 122 may launch an interface for trimming a digital media item in response to receiving a sharing command. In one embodiment, in which sharing module 122 runs on a server machine, sharing module 122 downloads JavaScript or other code to a client 102A-102N for the interface, and causes the client 102A-102N to execute the code. For example, sharing module 122 may launch a media editor in response to receiving a sharing command, and may cause a client to launch an interface to the media editor. Alternatively, or additionally, sharing module 122 may launch an interface to the media editor on the server machine. In another embodiment, in which sharing module 122 executes on a client machine (e.g., if sharing module is itself JavaScript code that was downloaded to a client machine), sharing module 122 may launch an interface and/or media editor on the client 102A-102N.

The media editor may provide only a single editing operation (e.g., a temporal trim operation), or may provide multiple different editing operations (e.g., trim, merge, add text, add voiceover, add effects, and so forth). An entity may interact with the interface running on the client. The interface may send instructions to sharing module 122 (whether sharing module is running on a server or client machine) based on the interaction. For example, a user may generate an edit command via the interface, and the edit command may be communicated to sharing module 122. Alternatively, or additionally, an entity may interact with the interface running on server machine 115 via a web browser running on the client 102A-102N.

In response to receiving an edit command, sharing module 122 may edit the digital media item. Sharing module 122 may then save an edited (e.g., trimmed) version of the digital media item in repository 120 or at another location. Sharing module 122 may then generate and post a link to the edited version of the digital media item. In an alternative embodiment, sharing module 122 may generate a link to the original digital media item that includes the requested editing operations. In response to an entity selecting the link (e.g., clicking on the link), playback module 124 may edit the digital media item to produce an edited (e.g., trimmed) version of the digital media item before presenting the digital media item to the entity. One embodiment of sharing module 122 is discussed in greater detail below with reference to FIG. 2.

Playback module 124 plays or otherwise presents digital media items to requesting entities. An entity may select or otherwise interact with a link to a digital media item or embed code associated with a digital media item. In response, playback module 124 may locate the digital media item in repository 120, and stream or download the digital media item to a requesting client 102A-102N (or to a third party website that provides the digital media item to the requesting client). If the link included editing commands, playback module 124 may execute those editing commands before presenting a digital media item identified in the accessed link to the requesting entity. One embodiment of playback module 124 is discussed in greater detail below with reference to FIG. 3.

Figure 2:
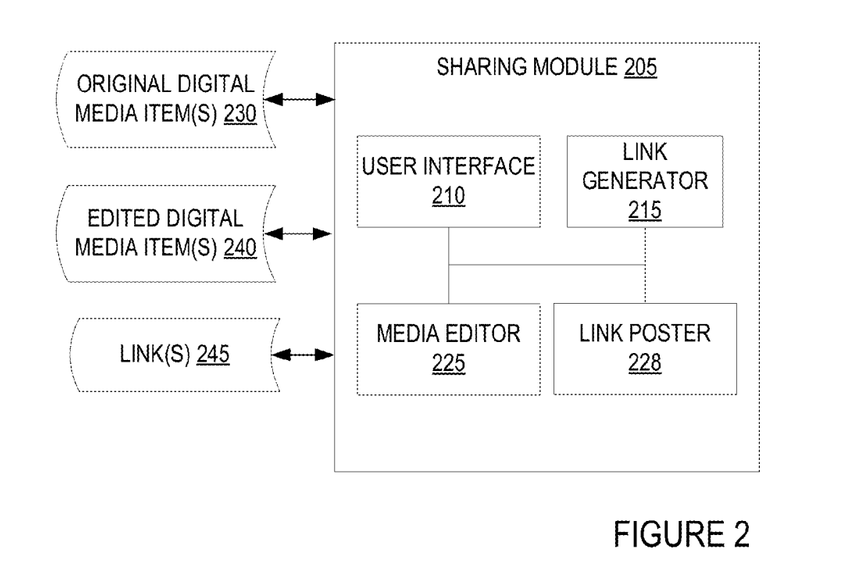
FIG. 2 is a block diagram of a sharing module, in accordance with one embodiment of the present invention.

FIG. 2 is a block diagram of a sharing module 205, in accordance with one embodiment of the present invention. The sharing module 205 may include a user interface 210, a link generator 215, and/or a media item modifier 225. Note that in alternative embodiments, the functionality of one or more of the user interface 210, link generator 215, and/or media item modifier 225 may be combined into a single module or divided into multiple modules. Sharing module 205 may run on a server machine and/or on a client machine.

Sharing module 205 is invoked in response to an entity requesting to share a digital media item. The selected digital media item may be an original digital media item 230 that was previously uploaded by an entity than the entity requesting to share that digital media item. Once invoked, sharing module 205 presents user interface 210 to the requesting entity. In one embodiment, sharing module 205 downloads JavaScript or other code for the user interface 210 to a client, and causes the client to execute the code. Therefore, the user interface may run on a server machine, on a client machine, or on both. The user interface 210 may present the digital media item (e.g., original digital media item 230) to be shared and may allow an entity to provide inputs for one or more editing operations. The editing operations may include trim operations, add effects operations, add text or voiceover operations, etc. A user or other entity may provide commands to the user interface. The user interface may then show an updated digital media item based on the commands.

Figure 4A:
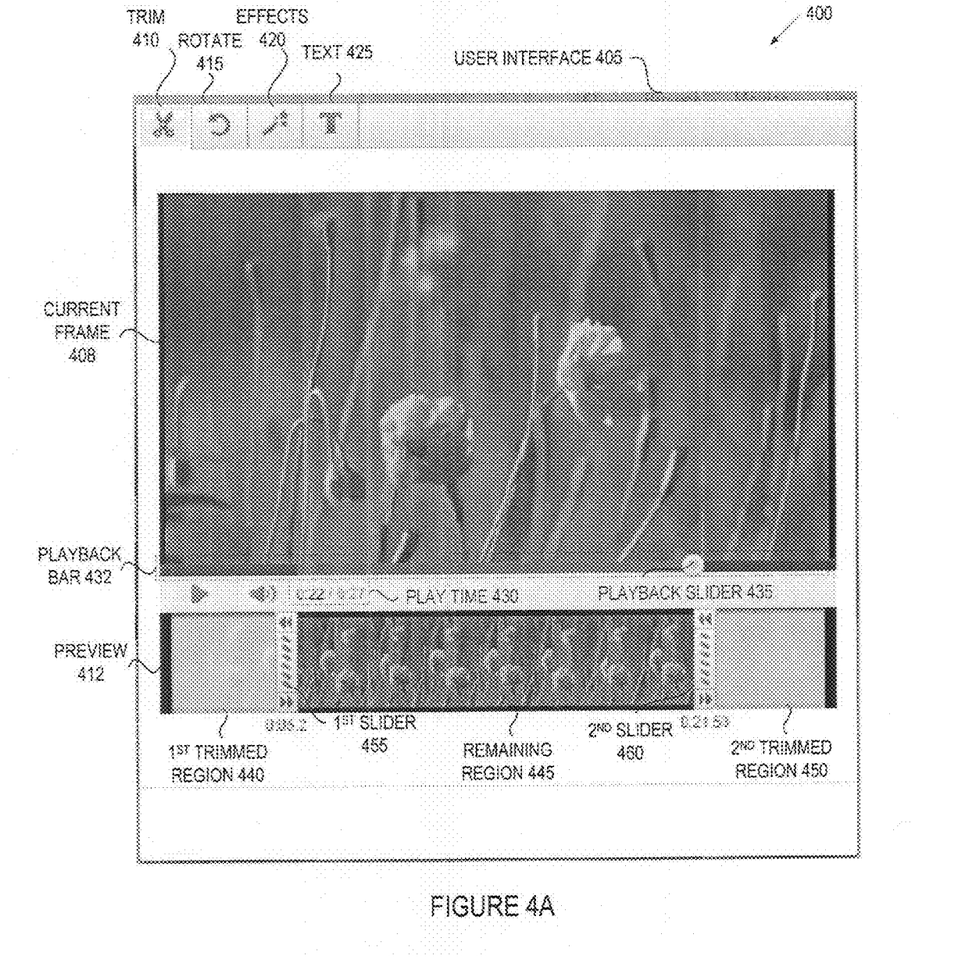
FIGS. 4A-4B illustrate a user interface for trimming video, in accordance with one embodiment of the present invention.
Figure 4B:
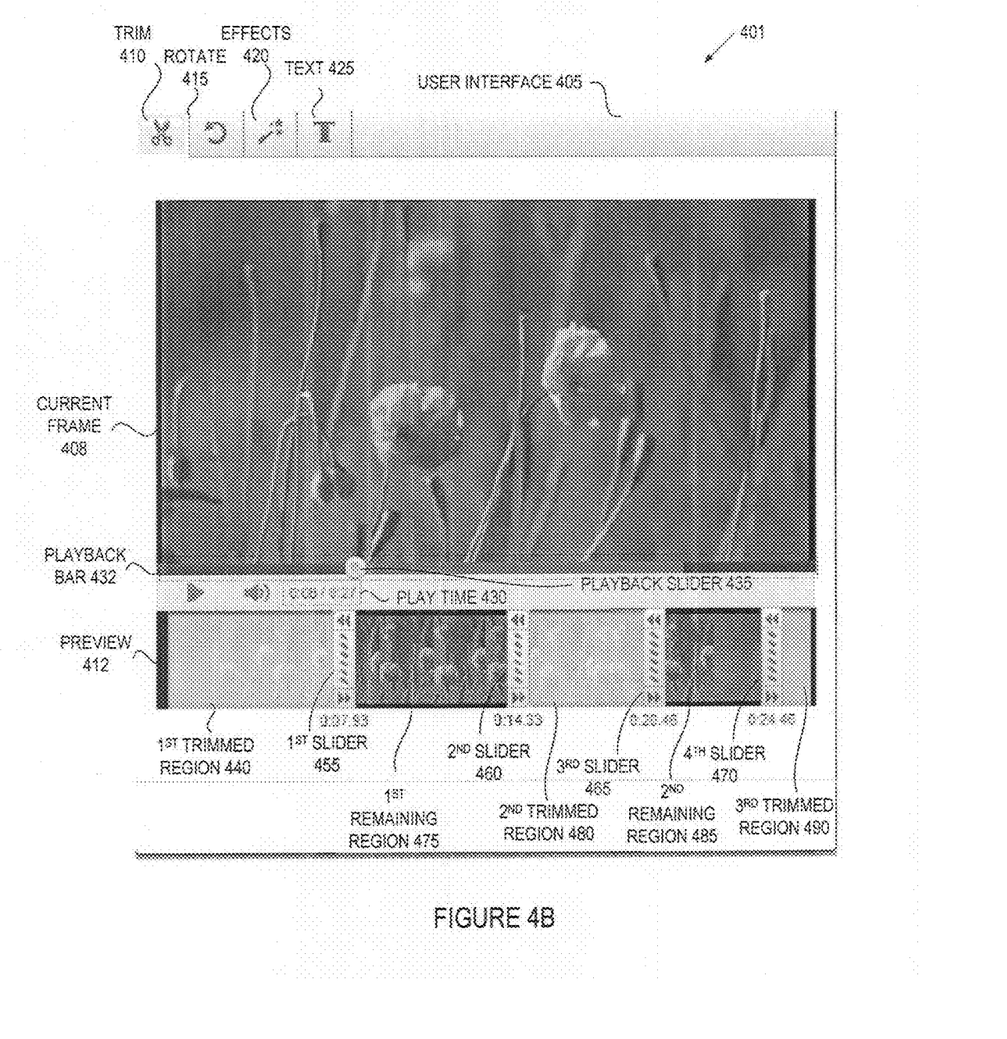

FIGS. 4A-4B illustrate embodiments of a user interface 405 for modifying a video in response to a sharing request. As shown, user interface 405 may show a current play time and total play time 430 for the video, as well as a current frame 408 corresponding to the current play time 430. A playback slider 435 is positioned on a region of a playback bar 432 that corresponds to the current play time 430. The playback slider 435 may be adjusted (e.g., dragged) to any other region of the playback bar 432 to adjust the current play time 430. As illustrated, the user interface 405 may also include a preview 412 of the video. The preview 412 may include a series of thumbnail images arranged sequentially. This sequence of thumbnail images may provide an overview of the contents of the video.

FIG. 4A illustrates a first view 400 of the user interface 405, in accordance with one embodiment of the present invention. In the first view 400, the preview 412 includes a first slider 455 and a second slider 460. Both the first slider 455 and second slider 460 may be repositioned anywhere on the preview 412. The first slider 455 may designate a beginning of a trimmed version of the video. A first trimmed region 440 to the left of the slider 455 may not be included in the trimmed version of the video. Similarly, the second slider 460 may designate an end of the trimmed version of the video. A second trimmed region 450 to the right of the second slider 460 may not be included in the trimmed version of the video, while a remaining region 445 between the first slider 455 and the second slider 460 may be included in the trimmed version of the video. Both of the sliders may be moved, for example, by clicking on the slider and dragging it to a new position on the preview 412. In FIG. 4A, the first slider 455 is positioned 5.2 seconds into the video, and the second slider 460 is positioned 21.53 seconds into the video. Therefore, the first trimmed region 440 contains the first 5.2 seconds of the video, the remaining region 445 contains seconds 5.2-21.53 of the video, and the second trimmed region 450 contains seconds 21.53 to the end of the video. A link generated based on the slider positions shown in view 400 would, when accessed, cause the video to play from seconds 5.2 to 21.53.

FIG. 4B illustrates a second view 401 of the user interface 405, in accordance with another embodiment of the present invention. In second view 401, preview 412 includes a third slider 465 and a fourth slider 470 in addition to the first slider 455 and the second slider 460. Note that more or fewer sliders may be used. In one embodiment, new sliders can be added to the preview 412 based on user commands. For example, users may right click on the preview 412 to bring up an option to add an additional slider. Alternatively, or in addition, an image of a slider may be shown outside of the preview 412. A user may drag and drop that image of a slider into preview 412 to add an additional slider. In one embodiment, new sliders are added to preview 412 in pairs.

As shown, the first slider 455 is positioned 7.93 seconds into the video, the second slider 460 is positioned 14.33 seconds into the video, the third slider 365 is positioned 20.46 seconds into the video, and the fourth slider 470 is positioned 24.46 seconds into the video. Therefore, the first trimmed region 440 contains the first 7.93 seconds of the video, a first remaining region 475 contains seconds 7.93-14.33 of the video, a second trimmed region 480 contains seconds 14.33 to 20.46 of the video, a second remaining region 485 contains seconds 20.46 to 24.46 of the video, and a third trimmed region 490 contains seconds 24.46 to the end of the video. A link generated based on the slider positions shown in view 401 would, when accessed, cause the video to play from seconds 7.93 to 14.33 and then from 20.46 to 24.46.

Note that the user interface 405 may include elements other than sliders for providing user input for trim operations. For example, the user interface 405 may include a text box into which an entity can input specific start times and end times of a digital media item. User interface 405 may additionally include fast forward and/or rewind buttons for adjusting a start time and/or end time to use for a trim operation. The user interface 405 may also include options for performing other operations than a trim operation. For example, user interface 405 may include options for performing rotate operations, for adding effects and for adding text or voiceovers. User interface 405 may include a rotate button 415 that, when selected, provides options for rotating the video clockwise or counterclockwise. User interface 405 may also include an effects button 420, which may provide options for adding one or more effects to the video. Such effects may include transition effects between different remaining regions (e.g., between first remaining region 475 and second remaining region 485), such as fade in and fade out, merge from fade, etc. Such effects may also include changes in intensity or contrast, color changes (e.g., converting the video to black and white or adding a specific color filter to the video), a stabilization effect to stabilize a shaky video, etc. In the case of images, effects may include for example, red eye reduction or other photo specific effects. User interface 405 may also include a text button 425 for adding text and/or voiceover to the video.

Returning to FIG. 2, once an entity is finished selecting edit operations (e.g., temporal trimming operations) for a digital media item (e.g., a video), media editor 225 may perform the selected edit operations on the digital media item. For example, media editor 225 may trim one or more portions of the digital media item, may add effects to the digital media item, may add text or voiceover to the digital media item, may merge the digital media item (or a portion of the digital media item) with another digital media item, and so forth. Media editor 225 may then save an edited (e.g., temporally trimmed) version of the digital media item 240 in a repository.

In one embodiment, once media editor 225 saves the edited version of the digital media item 240, link generator 215 generates a link 245 to that edited digital media item 240. The link (also known as a hyperlink) is a reference to data that an application (e.g., a web browser) can directly follow to access the data. The link, when selected or accessed, may cause a web browser or other application to load a web page provided by a web server that hosts the digital media item associated with the link. The link may be a long form link that specifies a full address for the digital media item. An example of such a long form link is http://www.yourvideo.com/watch?v=flowers. Alternatively, the link may be a short form link that includes an alias that can be interpreted by a universal resource locator (URL) shortening service to determine a full URL associated with the link. An example of a short form link to a digital media item is http://yvid.eo/flowers.

In one embodiment, the link 245 points to the edited media item 240. In an alternative embodiment, media editor 225 may not edit the original media item 230 prior to generation of the link 245. In such an embodiment, the link 245 may be to the original digital media item 230. However, in such an embodiment, the link may include instructions for performing the selected operations on the digital media item. The instructions may be additional text added to an end of the link. For example, the language "?7:93-14:33" may be added to indicate that seconds 7.93 to 14.33 of a particular video are to be shown when the link is used. Accordingly, when a user clicks on such a link 245, a playback module (discussed below) receives an access request along with the operations, and may perform the operations on the original digital media item before presenting the digital media item to the user.

Note that rather than or in addition to generating a link to a digital media item, link generator 215 may generate an embed code for the digital media item. The embed code, when selected or accessed, may not cause a web browser or other application (e.g., an email application) to load a web page provided by the web server that hosts the digital media item, or play the media item within the application itself. Instead, a web server of a current web page that is visited by the browser may contact the web server that hosts the digital media item, and may request that the digital media item be streamed or downloaded to the client. Embed code may include hypertext markup language (HTML) code that may cause a media player to be expanded into a web page of a web server. The media player may be, for example, a Flash player or a hypertext markup language 5 (HTML5) player. An example of an embed code is as follows:

<iframe width="420" height="315"
src="http://www.yourvideo.com/embed/flowers"
frameborders="0" allowfullscreen></iframe>

In one embodiment, the embed code loads an edited media item. Alternatively, the embed code may store instructions to perform selected operations on a media item. These instructions may be used to perform the selected operations in response to the embed code being accessed. Such instructions may be additional text added to the embed code (e.g., playtime=7:43-14:33).

Once link generator 215 generates a link (or embed code), link poster 228 may post the link (or embed code) to one or more locations specified by the requesting entity. For example, link poster 228 may post the link (or embed code) to specified social network websites, to specified blogs, to specified forums, etc. Link poster 228 may also email the link (or embed code) to specified email addresses.

Figure 3:
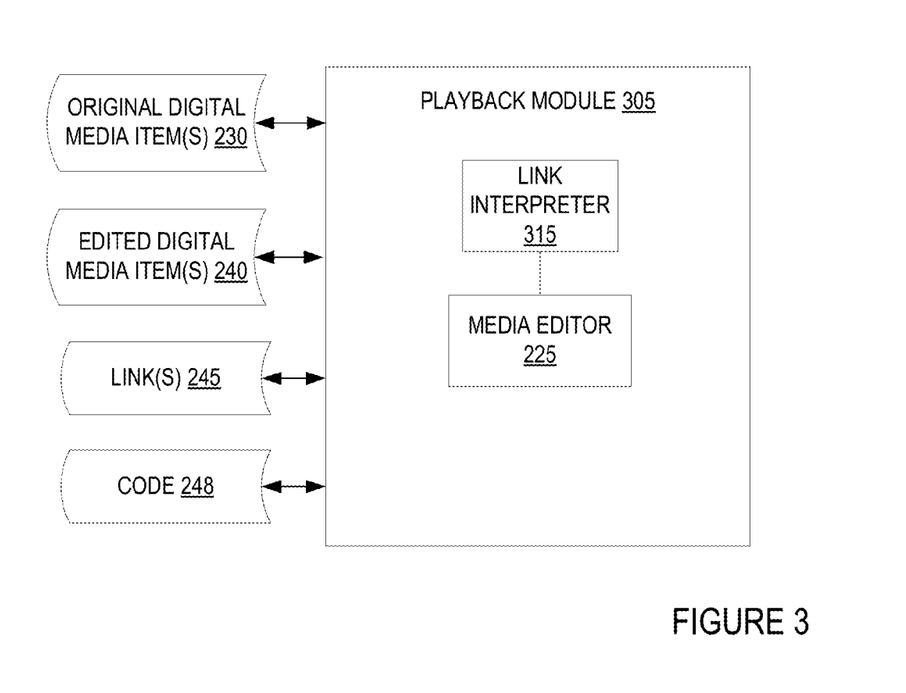
FIG. 3 is a block diagram of a playback module, in accordance with one embodiment of the present invention.

FIG. 3 is a block diagram of a playback module 305, in accordance with one embodiment of the present invention. The playback module 305 includes a link interpreter 315 and a media editor 225. Note that in alternative embodiments, the functionality the user media editor 225 and/or link interpreter 315 may be combined into a single module or divided into multiple modules.

When an entity that is connected to a network (e.g., the Internet) selects a link 245 (e.g., clicks on the link) in an application that can infer a URL from the link, that application may contact a web server that hosts playback module 305. The web server may then invoke playback module 305. Playback module 305 may transmit code 248 such as JavaScript code to the application. The JavaScript code may be for a media player. The application may execute the JavaScript code to invoke a media player that can play or otherwise present the digital media item associated with the link. Note that playback module 205 may also be invoked in response to an entity interacting with embed code associated with the digital media item.

Links (or embed code) may be to original unedited media items 230 or to previously edited digital media items 240. Links (or embed code) to, for example, original digital media items 230 may include instructions for editing the digital media items 230. In one embodiment, link interpreter 315 parses information received in response to an entity accessing the link (or embed code) to determine whether the link (or embed code) includes any commands for editing operations. For example, link interpreter 315 may interpret the language "?7:93-14:33" at the end of the link to mean play only seconds 7.93 to 14.33 of the digital media item associated with the link. If link interpreter 315 identifies any operations that are to be performed on a digital media item before it is presented, link interpreter invokes media editor 225. Media editor 225 then performs the identified operations on the digital media item identified in the link (or embed code). Once the edits have been performed, playback module 305 may stream or download the digital media item to the client. The media player executing on the client may then play or otherwise present the digital media item. In such an embodiment, an edited version of the digital media item 240 may be maintained in memory of a server machine hosting playback module during a current session with a client. The edited version may then be cleared from memory when the session is terminated.

FIGS. 5-8 are flow diagrams of various embodiments of methods for sharing trimmed versions of digital media items. The methods are performed by processing logic that may comprise hardware (circuitry, dedicated logic, etc.), software (such as is run on a general purpose computer system or a dedicated machine), or a combination of both. In one embodiment, the methods are performed by the server machine 115 of FIG. 1. The methods of FIG. 5-8 may be performed by sharing module 122 and/or playback module 124 running on server machine 115 or another machine (e.g., a client machine).

Figure 5:
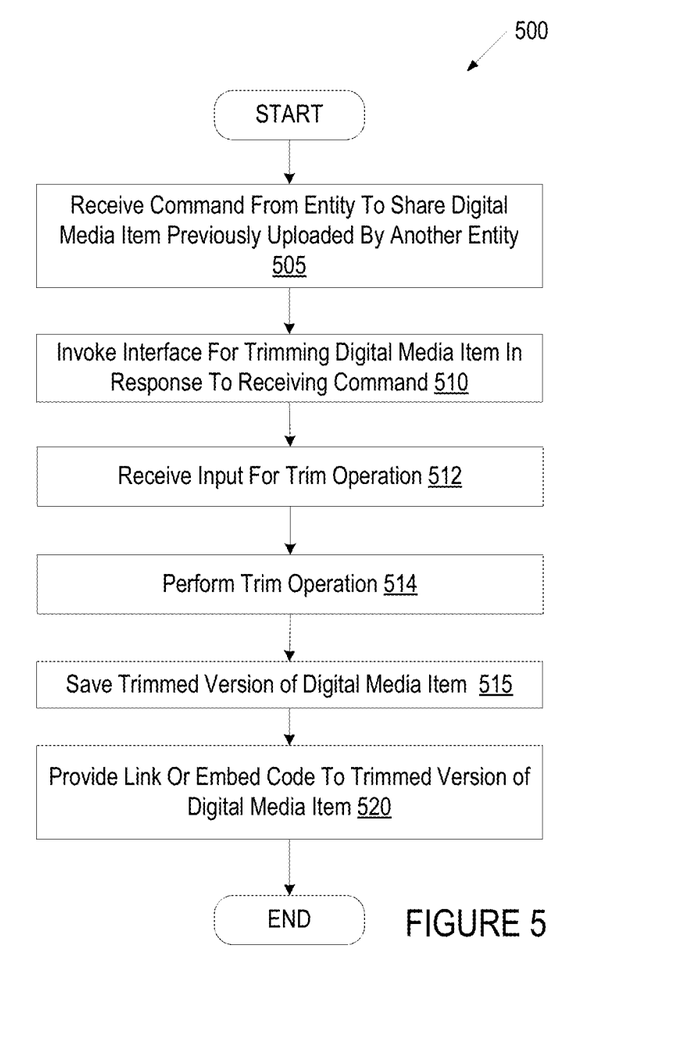
FIG. 5 is a flow diagram illustrating one embodiment for a method of sharing a trimmed version of a digital media item.

FIG. 5 is a flow diagram illustrating one embodiment for a method 500 of sharing a trimmed version of a digital media item. In one embodiment, the digital media item is a video. Alternatively, the digital media item may be an audio file or image. At block 505 of method 500, processing logic receives a command from an entity to share a digital media item previously uploaded by another entity. The digital media item may be stored by a media hosting service such as a video hosting website or image hosting website.

At block 510, processing logic invokes an interface for trimming (e.g., temporally trimming) the digital media item in response to receiving the command. In one embodiment, the interface for trimming the digital media item is invoked if the entity selects an "edit and share" function provided by the processing logic. In one embodiment, the interface corresponds to user interface 405 of FIG. 4A and/or FIG. 4B. In another embodiment, the interface corresponds to a different user interface providing trimming options for an entity.

At block 512, processing logic receives input for a trim operation. The input may specify one or more regions of the digital media item to keep and/or one or more regions of the digital media item to remove. At block 514, processing logic performs a trim operation based on the received input. At block 515, processing logic saves a trimmed version of the digital media item. The trimmed version of the digital media item may be stored as a separate file in a same repository or different repository as the original digital media item that was trimmed. In one embodiment, the trimmed version of the digital media item is saved as a delta from the original version of the digital media item. This may reduce an amount of storage space that is consumed by the trimmed version of the digital media item.

At block 520, processing logic provides a link or embed code for the trimmed version of the digital media item. The link may be a long form URL hyperlink or a short form URL hyperlink. When an entity accesses the link from a location to which it was posted, that entity will be redirected to a website of the digital media item's host, which will play or otherwise present the digital media item. An embed code may include code for presenting the digital media item directly from a location to which the embed code is posted. In such an embodiment, when an entity accesses the embed code from a location to which it was posted, that location may retrieve the digital media item from the digital media item's host, and then present the digital media item to the entity. Thus, the entity may view the trimmed digital media item without leaving the location to which the embed code was posted.

Figure 6:
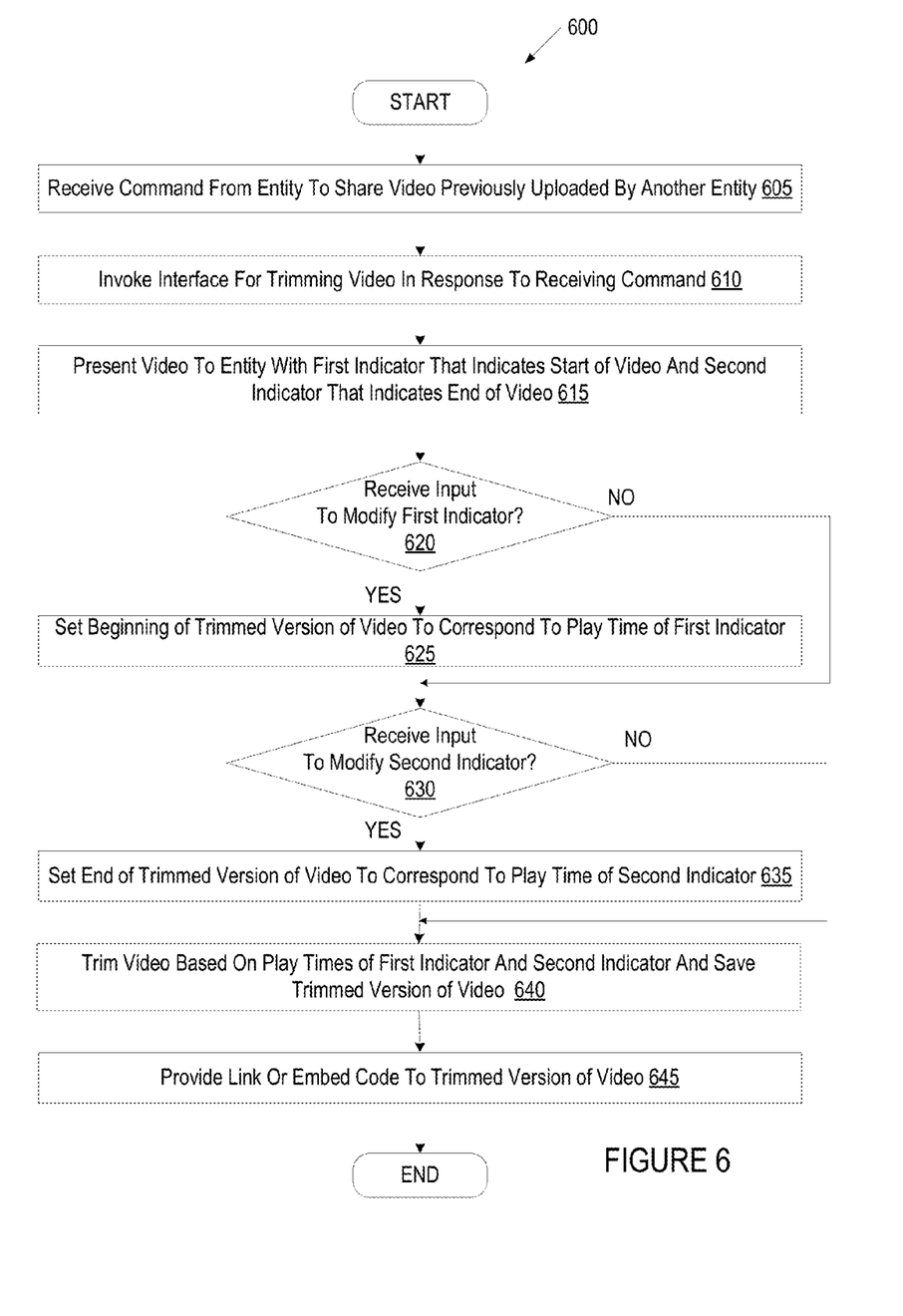
FIG. 6 is a flow diagram illustrating one embodiment for a method of sharing a trimmed version of a video.

FIG. 6 is a flow diagram illustrating one embodiment for a method 600 of sharing a trimmed version of a video. At block 605 of method 600, processing logic receives a command from an entity to share a video previously uploaded by another entity. At block 610, processing logic invokes an interface for trimming the video in response to receiving the command. The interface may be invoked on a client, on a server, or both. The interface may be an interface of a video editor. The video editor may include functionality for performing just a trim operation, or may include additional functionality for performing other edit operations such as a merge operation, an add effects operation, and so forth. In one embodiment, the video editor presents a preview of the video along with a first indicator and a second indicator in the interface. In alternative embodiments, more or fewer sliders may be presented. The indicators may be in the form of sliders, and a user or other entity may adjust the sliders by moving them to any play time in the preview. Boundaries set by the sliders may then identify regions of the video to trim. In further embodiments, the indicators may be elements other than sliders. For example, the indicators may be numerical indicators. A user may type in a start and end time that identify regions of the video to trim in such numerical indicators.

At block 615, processing logic presents the video to the entity with indicators of a start of the video and an end of the video. At block 620, processing logic determines whether an input has been received to modify a first indicator to specify a start play time (e.g., by repositioning the first slider to the start play time). If so, then the method continues to block 625, and processing logic sets a beginning of a trimmed version of the video to correspond to the start play time associated with the modified first indicator. Otherwise, the method proceeds to block 630.

At block 630, processing logic determines whether an input has been received to modify a second indicator to specify an end play time (e.g., by repositioning the second slider to the second play time). If so, then the method continues to block 635, and processing logic sets an end of the trimmed version of the video to correspond to the end play time associated with the modified second identifier. Otherwise, the method proceeds to block 640.

At block 640, processing logic trims the video based on the start play time and the end play time, and saves the trimmed version of the video to permanent storage. At block 645, processing logic provides a link or embed code for the trimmed version of the video. Providing the link or embed code may include providing a link or embed code that can be copied and pasted by the entity to a web page, email, etc. Alternatively, providing the link or embed code may further include posting the link or embed code for websites or other locations specified by the entity.

Note that though method 600 has been described with reference to a first and second indicator, additional indicators may be used to trim additional portions of the digital media item. For example, a first pair of sliders may be used to specify that seconds 10-20 of the video will be included in the trimmed version of the video, and a second pair of sliders may be used to specify that seconds 40-50 of the video will be included in the trimmed version of the video. Alternatively, a single indicator may be used to receive multiple trim inputs.

Figure 7:
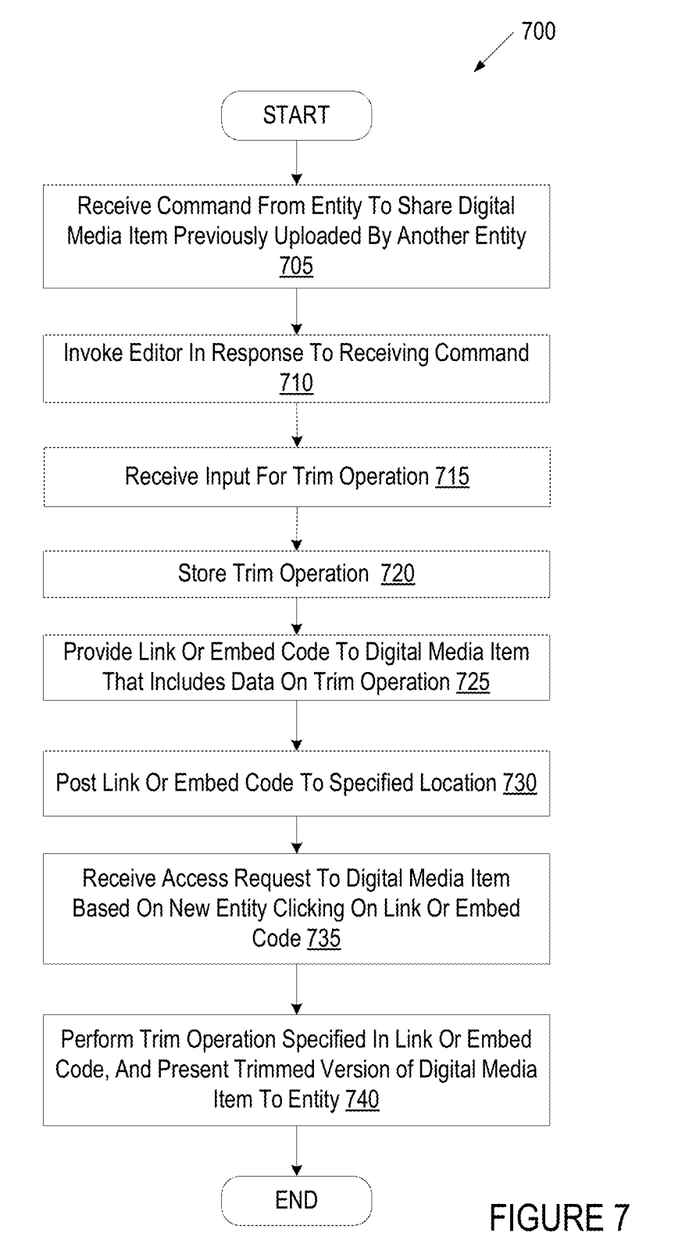
FIG. 7 is a flow diagram illustrating another embodiment for a method of sharing an edited version of a digital media item.

FIG. 7 is a flow diagram illustrating another embodiment for a method 700 of sharing an edited version of a digital media item. At block 705 of method 700, processing logic receives a command from an entity to share a digital media item previously uploaded by an entity. At block 710, processing logic invokes an editor in response to receiving the command. At block 715, processing logic receives an input for a trim operation based on the entity using the editor. At block 720, processing logic stores the trim operation (e.g., stores a trim operation command). At block 725, processing logic provides a link or embed code for the digital media item. The provided link or embed code includes an identification of the requested trim operation (e.g., the trim operation command), which may be stored, for example, at an end of the link or embed code. At block 730, processing logic posts the link or embed code to a specified location or locations (e.g., to a user profile on a social networking website, to a forum, to a blog, etc.).

At block 735, processing logic receives an access request to the digital media item based on a new entity clicking on the link or embed code (or otherwise accessing the link or embed code). The access request may be received from a client operated by the entity if a link is used. Alternatively, the access request may be received from the location to which embed code was posted if the embed code is used.

At block 740, processing logic performs the trim operation specified in the link or embed code in response to receiving the access request. Processing logic then presents the trimmed version of the digital media item to the entity.

Alternatively, in the case of embed code, processing logic may provide the trimmed version of the digital media item to the location to which the embed code was posted, and that location may present the digital media item to the entity.

Figure 8:
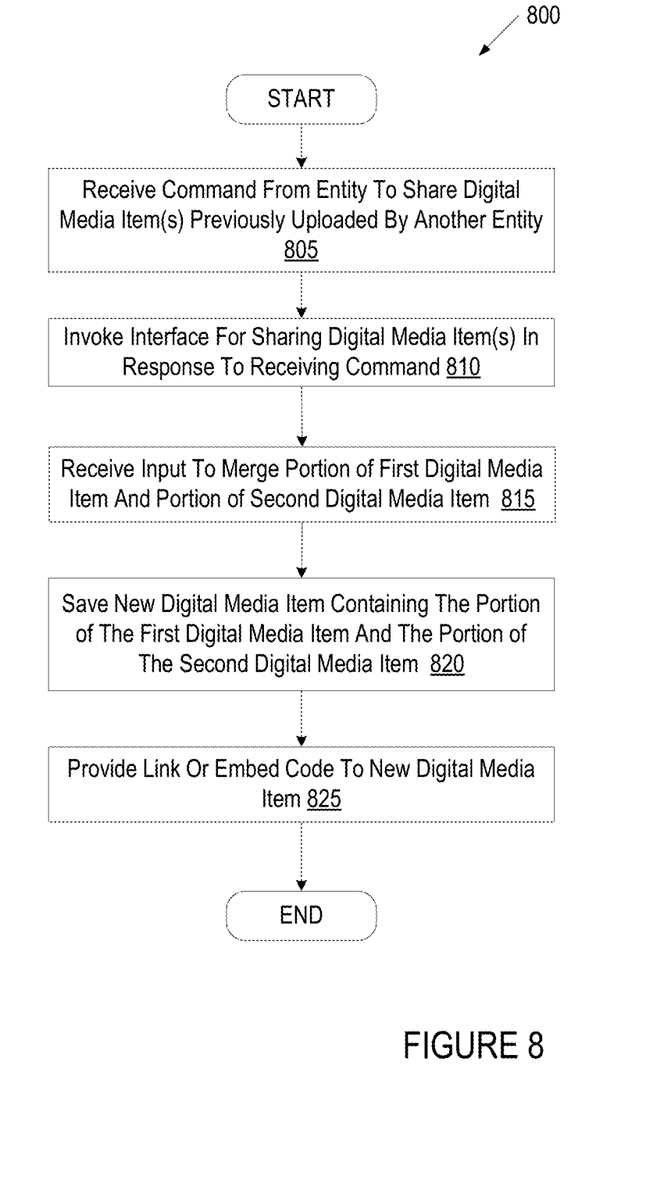
FIG. 8 is a flow diagram illustrating one embodiment for a method of sharing multiple digital media items.

FIG. 8 is a flow diagram illustrating one embodiment for a method 800 of sharing multiple digital media items. At block 805 of method 800, processing logic receives a command from an entity to share one or more digital media items previously uploaded by an entity. At block 810, processing logic invokes an interface for modifying and sharing digital media items in response to receiving the command. At block 815, processing logic receives input to merge at least a portion of a first digital media item with at least a portion of a second digital media item. The input may specify a trimmed portion of the first digital media item to merge with a trimmed portion of the second digital media item (e.g., using the previously described sliders).

At block 820, processing logic saves a new digital media item containing the portion of the first digital media item and the portion of the second digital media item. At block 825, processing logic provides a link or embed code for the new digital media item. Note that rather than generating and saving a new digital media item, processing logic may include in the link or embed code an identification of the first digital media item and of the second digital media item along with instructions to merge the portion of the first digital media item to the portion of the second digital media item. In either case, an entity accessing the link or embed code may be presented with the merged portions of the first and second digital media items. For example, the entity may see a concatenated clip that includes a first two minutes of the first digital media item followed by a last three minutes of the second digital media item.

Figure 9:
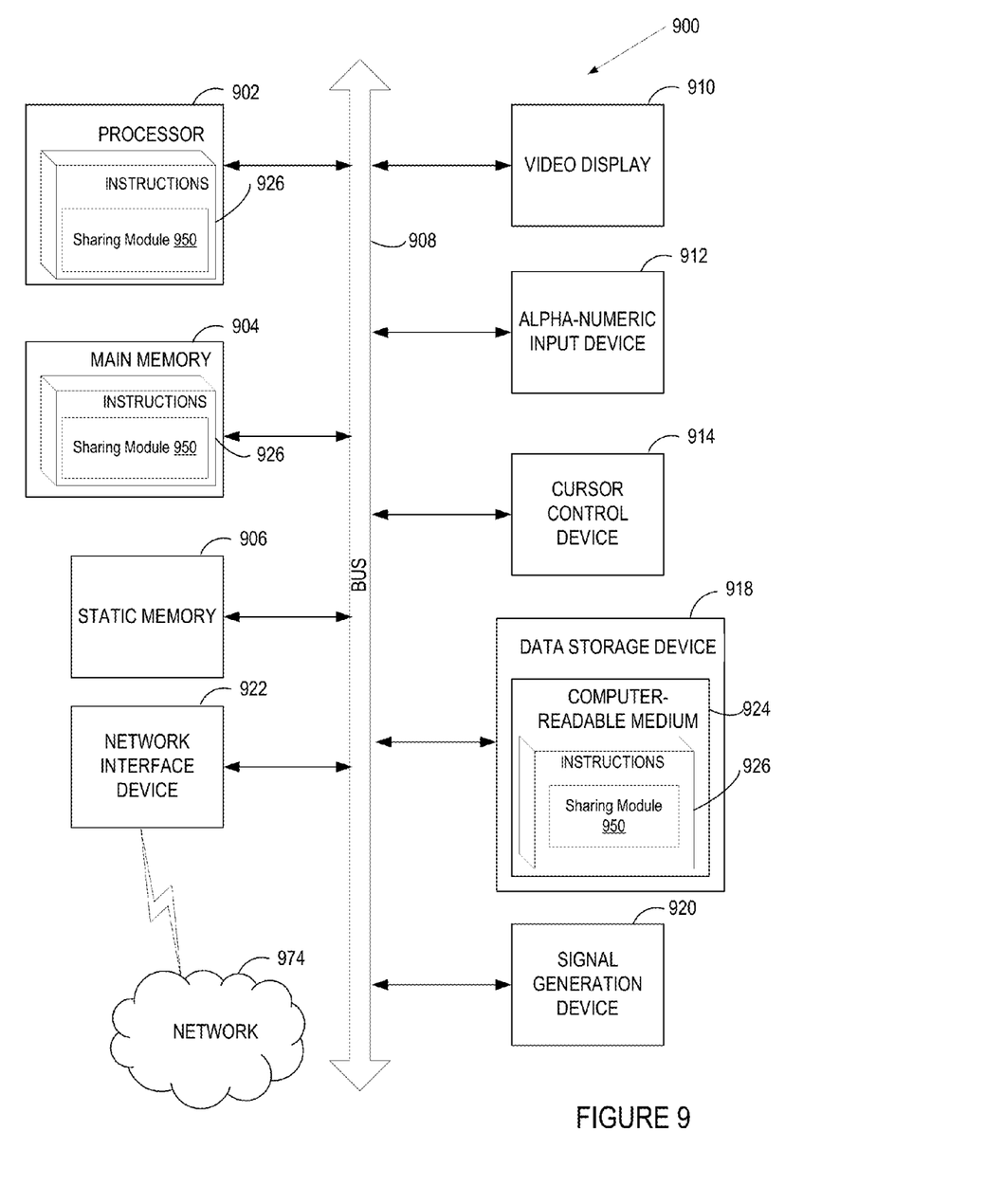
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 via the network interface device 922.

In one embodiment, the instructions 926 include instructions for a sharing module 950, which may correspond to sharing module 205 of FIG. 2, and/or a software library containing methods that call a sharing module. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method comprising:
    receiving, by a user device, a command from an entity to share a digital media item with one or more users, the digital media item provided to a media hosting service by another entity, wherein the digital media item is a video or audio file that is hosted by a server of the media hosting service, wherein the digital media item hosted by the server is being edited via a user interface on the user device;
    presenting, by the user device, the user interface for trimming the digital media item to be shared with the one or more users in response to receiving the command to share the digital media item with the one or more users, the user interface comprising a first portion for playing the digital media item to be shared, and a second portion providing a preview of the digital media item and graphically illustrating the trimming of the digital item using at least two pairs of sliders, wherein the preview comprises a plurality of thumbnail images arranged sequentially to graphically represent the digital media item, and each of the plurality of sliders is displayed in the preview with a corresponding time within a playback of the digital media item to be shared with the one or more users;
    receiving, via the user interface, input of the entity for a trim operation to be performed on the digital media item to be shared with the one or more users, wherein the input of the entity for the trim operation comprises moving the at least two pairs of sliders to new locations in the preview to divide the digital media item into a plurality of non-consecutive trimmed regions and a plurality of non-consecutive remaining regions, wherein the new locations in the preview are displayed with new times within the playback of the digital media item to be shared with the one or more users; and
    in response to receiving the input of the entity for the trim operation to be performed on the digital media item to be shared with the one or more users:
        providing a link or embed code for a trimmed digital media item resulting from performing the trim operation on the digital media item to be shared with the one or more users; and
        causing the trimmed digital media item to be shared with the one or more users, wherein accessing the link or the embed code causes an output of the trim operation to be presented to a user of the one or more users, wherein the trimmed digital media item comprises the plurality of non-consecutive remaining regions but not the plurality of non-consecutive trimmed regions.

2. The method of claim 1, further comprising:
    storing the output of the trim operation by saving the trimmed digital media item.

3. The method of claim 1, further comprising:
    storing the trim operation in the link or the embed code, wherein accessing the link or the embed code causes the trim operation to be performed on the digital media item before the trimmed digital media item is presented to the user.

4. The method of claim 3, wherein:
    storing the trim operation comprises storing a first marker for a first location of a first slider of the at least two pairs of sliders within the playback of the digital media item, a second marker for a second location of a second slider of the at least two pairs of sliders within the playback of the digital media item, a third marker for a third location of a third slider of the at least two pairs of sliders within the playback of the digital media item, and a fourth marker for a fourth location of a fourth slider of the at least two pairs of sliders within the playback of the digital media item; and
    performing the trim operation on the digital media item comprises using the first marker to identify the first location from which to begin playback, using the second marker to identify the second location from which to skip the trimmed region, using the third marker to identify the third location from which to continue playback, and using the fourth marker to identify the fourth location at which to end playback, wherein the first marker, the second marker, the third marker and the fourth marker are stored in the link or the embed code.

5. The method of claim 1, wherein the user interface for trimming the digital media item is an interface of a video editor, the method further comprising:
    presenting in the user interface a first slider of the at least two pairs of sliders, a second slider of the at least two pairs of sliders, a third slider of the at least two pairs of sliders, and a fourth slider of the at least two pairs of sliders;
    wherein receiving the input for the trim operation comprises receiving a command to move the first slider of the at least two pairs of sliders to a first location, a command to move the second slider of the at least two pairs of sliders to a second location, a command to move the third slider of the at least two pairs of sliders to a third location, and a command to move the fourth slider of the at least two pairs of sliders to a fourth location.

6. The method of claim 1, further comprising:
receiving a command from the entity to share an additional digital media item that was also uploaded by another entity, wherein the digital media item and the additional digital media item are videos; and
performing a merge operation to join the digital media item and the additional media item.

7. The method of claim 1 further comprising:
in response to the received input for the trim operation, causing a preview of one or more trimmed portions and one or more remaining portions of the digital media item to be presented to the entity in the user interface.

8. The method of claim 1, comprising:
receiving, via the user interface, input for one or more editing operations to be performed on the digital media item to be shared with the one or more users, wherein the one or more editing operations comprise a rotate operation for the digital media item, adding one or more effects to the digital media item, or adding a voiceover to the digital media item.

9. The method of claim 8, wherein the one or more effects comprise fading in, fading out, intensity and contrast changes, red eye reduction, or stabilization.

10. A non-transitory computer readable storage medium having instructions that, when executed by a user device, cause the user device to perform a method comprising:
receiving, by the user device, a command from an entity to share a digital media item with one or more users, the digital media item provided to a media hosting service by another entity, wherein the digital media item is a video or audio file that is hosted by a server of the media hosting service, wherein the digital media item hosted by the server is being edited via a user interface on the user device;
presenting, by the user device, the user interface for trimming the digital media item to be shared with the one or more users in response to receiving the command to share the digital media item with the one or more users, the user interface comprising a first portion for playing the digital media item to be shared, and a second portion providing a preview of the digital media item and graphically illustrating the trimming of the digital item using at least two pairs of sliders, wherein the preview comprises a plurality of thumbnail images arranged sequentially to graphically represent the digital media item, and each of the plurality of sliders is displayed in the preview with a corresponding time within a playback of the digital media item to be shared with the one or more users;
receiving, via the user interface, input of the entity for a trim operation to be performed on the digital media item to be shared with the one or more users, wherein the input of the entity for the trim operation comprises moving the at least two pairs of sliders to new locations in the preview to divide the digital media item into a plurality of non-consecutive trimmed regions and a plurality of non-consecutive remaining regions, wherein the new locations in the preview are displayed with new times within the playback of the digital media item to be shared with the one or more users; and
in response to receiving the input of the entity for the trim operation to be performed on the digital media item to be shared with the one or more users:
providing a link or embed code for a trimmed digital media item resulting from performing the trim operation on the digital media item to be shared with the one or more users; and
causing the trimmed digital media item to be shared with the one or more users, wherein accessing the link or the embed code causes an output of the trim operation to be presented to a user of the one or more users, wherein the trimmed digital media item comprises the plurality of non-consecutive remaining regions but not the plurality of non-consecutive trimmed regions.

11. The computer readable storage medium of claim 10, the method further comprising:
storing the output of the trim operation by saving the trimmed digital media item.

12. The computer readable storage medium of claim 10, the method further comprising:
storing the trim operation in the link or the embed code, wherein accessing the link or the embed code causes the trim operation to be performed on the digital media item before the trimmed digital media item is presented to the user.

13. The computer readable storage medium of claim 12, wherein:
storing the trim operation comprises storing a first marker for a first location of a first slider of the at least two pairs of sliders within the playback of the digital media item, a second marker for a second location of a second slider of the at least two pairs of sliders within the playback of the digital media item, a third marker for a third location of a third slider of the at least two pairs of sliders within the playback of the digital media item, and a fourth marker for a fourth location of a fourth slider of the at least two pairs of sliders within the playback of the digital media item; and
performing the trim operation on the digital media item comprises using the first marker to identify the first location from which to begin playback, using the second marker to identify the second location from which to skip the trimmed region, using the third marker to identify the third location from which to continue playback, and using the fourth marker to identify the fourth location at which to end playback, wherein the first marker, the second marker, the third marker and the fourth marker are stored in the link or the embed code.

14. The computer readable storage medium of claim 10, wherein the user interface for trimming the digital media item is an interface of a video editor, the method further comprising:
presenting in the user interface a first slider of the at least two pairs of sliders, a second slider of the at least two pairs of sliders, a third slider of the at least two pairs of sliders, and a fourth slider of the at least two pairs of sliders;
wherein receiving the input for the trim operation comprises receiving a command to move the first slider of the at least two pairs of sliders to a first location, a command to move the second slider of the at least two pairs of sliders to a second location, a command to move the third slider of the at least two pairs of sliders to a third location, and a command to move the fourth slider of the at least two pairs of sliders to a fourth location.

15. The computer readable storage medium of claim 10, the method further comprising:

receiving a command from the entity to share an additional digital media item that was also uploaded by another entity, wherein the digital media item and the additional digital media item are videos; and performing a merge operation to join the digital media item and the additional media item.

16. A system for a user device, comprising:

a memory to store instructions; and a processor, coupled to the memory, to execute the instructions, wherein the processor is configured to:

receive a command from an entity to share a digital media item with one or more users, the digital media item provided to a media hosting service by another entity, wherein the digital media item is a video or audio file that is hosted by a server of the media hosting service, wherein the digital media item hosted by the server is being edited via a user interface on the user device;

present the user interface for trimming the digital media item to be shared with the one or more users in response to receiving the command to share the digital media item with the one or more users, the user interface comprising a first portion for playing the digital media item to be shared, and a second portion providing a preview of the digital media item and graphically illustrating the trimming of the digital item using at least two pairs of sliders, wherein the preview comprises a plurality of thumbnail images arranged sequentially to graphically represent the digital media item, and each of the plurality of sliders is displayed in the preview with a corresponding time within a playback of the digital media item to be shared with the one or more users;

receive, via the user interface, input of the entity for a trim operation to be performed on the digital media item to be shared with the one or more users, wherein the input of the entity for the trim operation comprises moving the at least two pairs of sliders to new locations in the preview to divide the digital media item into a plurality of non-consecutive trimmed regions and a plurality of non-consecutive remaining regions, wherein the new locations in the preview are displayed with new times within the playback of the digital media item to be shared with the one or more users;

provide a link or embed code for a trimmed digital media item resulting from performing the trim operation on the digital media item to be shared with the one or more users;

provide a link or embed code for the digital media item; and cause the trimmed digital media item to be shared with the one or more users, wherein accessing the link or the embed code causes an output of the trim operation to be presented to a user of the one or more users, wherein the trimmed digital media item comprises the plurality of non-consecutive remaining regions but not the plurality of non-consecutive trimmed regions.

17. The system of claim 16, wherein the processor is further configured to:

store the output of the trim operation by saving the trimmed digital media item.

18. The system of claim 16, wherein the processor is further configured to:

store the trim operation in the link or the embed code, wherein accessing the link or the embed code causes the trim operation to be performed on the digital media item before the trimmed digital media item is presented to the user.

19. The system of claim 18, wherein to store the trim operation, the processor is to:

store a first marker for a first location of a first slider of the plurality of sliders within the playback of the digital media item, a second marker for a second location of a second slider of the plurality of sliders within the playback of the digital media item, a third marker for a third location of a third slider of the plurality of sliders within the playback of the digital media item, and a fourth marker for a fourth location of a fourth slider of the plurality of sliders within the playback of the digital media item; and perform the trim operation on the digital media item comprises using the first marker to identify the first location from which to begin playback, using the second marker to identify the second location from which to skip the trimmed region, using the third marker to identify the third location from which to continue playback, and using the fourth marker to identify the fourth location at which to end playback, wherein the first marker, the second marker, the third marker and the fourth marker are stored in the link or the embed code.

20. The system of claim 16, wherein the user interface for trimming the digital media item is an interface of a video editor, and wherein the processing device is further configured to:

present in the user interface a first slider of the at least two pairs of sliders, a second slider of the at least two pairs of sliders, a third slider of the at least two pairs of sliders, and a fourth slider of the at least two pairs of sliders;

wherein to receive the input for the trim operation, the processing device is to receive a command to move the first slider of the at least two pairs of sliders to a first location, a command to move the second slider of the at least two pairs of sliders to a second location, a command to move the third slider of the at least two pairs of sliders to a third location, and a command to move the fourth slider of the at least two pairs of sliders to a fourth location.

21. The system of claim 16, wherein the processor is further configured to:

receive a command from the entity to share an additional digital media item that was also uploaded by another entity, wherein the digital media item and the additional digital media item are videos; and perform a merge operation to join the digital media item and the additional media item.

* * * * *